United States Patent
Van Bodegom et al.

(10) Patent No.: US 7,326,431 B2
(45) Date of Patent: Feb. 5, 2008

(54) FAT-EMULSIONS

(75) Inventors: Bertus Marinus Van Bodegom, Vlaardingen (NL); Suyitno Tjokrodihardjo, Yogyakarta (ID)

(73) Assignee: Unilever Bestfoods North America, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 10/484,686

(22) PCT Filed: Jul. 4, 2002

(86) PCT No.: PCT/EP02/07528

§ 371 (c)(1),
(2), (4) Date: Aug. 30, 2004

(87) PCT Pub. No.: WO03/009695

PCT Pub. Date: Feb. 6, 2003

(65) Prior Publication Data

US 2005/0019476 A1    Jan. 27, 2005

(30) Foreign Application Priority Data

Jul. 26, 2001 (EP) .................................. 01202852

(51) Int. Cl.
*A23D 7/00* (2006.01)

(52) U.S. Cl. ...................... 426/602; 426/601

(58) Field of Classification Search ..................... None
See application file for complete search history.

(56) References Cited

U.S. PATENT DOCUMENTS

| 2,147,751 A | | 2/1939 | Northoutt |
| 2,502,516 A | * | 4/1950 | Glabe ......................... 426/617 |
| 2,631,104 A | * | 3/1953 | Welker et al. ............... 426/617 |
| 3,573,064 A | * | 3/1971 | Noznick ...................... 426/617 |
| 3,892,873 A | | 7/1975 | Kolen et al. |
| 3,899,606 A | | 8/1975 | Forkner |
| 4,098,912 A | * | 7/1978 | Mercado-Flores et al. .. 426/617 |
| 4,948,617 A | | 8/1990 | Dartey et al. |
| 4,960,605 A | * | 10/1990 | Trecker et al. .............. 426/582 |
| 5,248,512 A | * | 9/1993 | Berberat et al. ............. 426/302 |
| 5,599,575 A | * | 2/1997 | Loh et al. .................... 426/617 |
| 5,698,254 A | | 12/1997 | Campbell et al. |
| 5,935,559 A | * | 8/1999 | Afriat et al. ............. 424/70.12 |
| 5,935,588 A | * | 8/1999 | Afriat et al. ................. 424/401 |
| 5,935,634 A | * | 8/1999 | Gamay et al. .............. 426/582 |
| 6,322,829 B1 | * | 11/2001 | McGlynn et al. ............ 426/89 |
| 2001/0002267 A1 | * | 5/2001 | Rapaport ..................... 426/94 |

FOREIGN PATENT DOCUMENTS

| DE | WO9926482 | * | 6/1999 |
| EP | 509 579 | | 10/1992 |
| EP | 788 747 | | 8/1997 |
| JP | 63 044841 | | 2/1988 |
| JP | 02 145165 | | 6/1990 |
| JP | 07 255 376 | | 10/1995 |
| JP | 11 146756 | | 6/1999 |
| JP | 2000/093070 | | 4/2000 |
| JP | 2000-093070 | * | 4/2000 |
| JP | 2000/139346 | | 5/2000 |

OTHER PUBLICATIONS

Motoki, M., 1982. Journal of Food Processing and Preservation 6(1)41. FSTA abstract 1983(12)G0884.*
Chirife, J. 1989. Journal of Food Science 54(6)1658.*
Peterson, M. et al. 1978. Encyclopedia of Food Science. The AVI Publishing Co., Inc., Westport, CT. p. 852-860.*
European Search Report on Application No. EP 01 20 2852 dated Jan. 10, 2002.

* cited by examiner

*Primary Examiner*—Carolyn Paden
(74) *Attorney, Agent, or Firm*—Gerard J. McGowan, Jr.

(57) ABSTRACT

The invention provides water continuous or bicontinuous fat emulsions, comprising fat, protein, humectants and relatively low amounts of water and which emulsions display an water activity of 0.6 to 0.8 and have a shelf life at ambient temperature of more than 6 months. A method of preparing the emissions is also provided.

15 Claims, No Drawings

_US 7,326,431 B2_

FAT-EMULSIONS

FIELD OF THE INVENTION

The present invention relates to edible fat emulsions. In particular, the invention relates to such fat emulsions which are water continuous or bicontinuous and which have certain water activities.

BACKGROUND OF THE INVENTION

Coconut paste is disclosed in U.S. Pat. No. 3,899,606. The product typically contains about 3.5 wt % moisture; about 65 wt % fat; about 7.2 wt % protein; about 3.9 wt % fibers and about 19 wt % carbohydrate or other fiber materials. The product is made by a process wherein coconut meat is washed with water and the washed meat is collected and treated with an acid to disrupt the cells, whereupon a fat solution is separated from a residue and the residue is neutralized and dewatered resulting in a dewatered product as the paste. This process has the disadvantage that a treatment of the coconut meat with acid and a subsequent neutralization are necessary, complicating the process. Moreover the product obtained is not a water continuous or bicontinuous fat emulsion, and the water activity of this emulsion will be very low (about 0.4 to 0.5) so that the emulsion is not very physically stable above 25° C.

From U.S. Pat. No. 2,147,751 a coconut product is known that comprises up to 5 wt % of water. This product is made by a process wherein copra is dehydrated before subjecting it to a grinding operation; otherwise a waxy non-meltable product is produced which cannot be used in the preparation of food products. The product obtained is a fat continuous emulsion and thus has the same disadvantages as mentioned above for the paste according to U.S. Pat. No. 3,899,606.

U.S. Pat. No. 5,599,575 discloses creamed coconut products with improved storage stability and organoleptic properties, which product contains finely divided coconut particles with a particle size of less than 30 microns and more than 50 wt % fat. This product will also be fat continuous because of its very low water content (1.5 to 3.5 wt % cf col 1, 1.36) and its preparation methodology. Therefore this product has similar defects as the products discussed above.

U.S. Pat. No. 4,098,912 discloses coconut cream that is pasteurised and homogenised. The cream is made by a process wherein coconut meat is pressed and the juice obtained is later recombined with part of the pulp separated during the pressing after this has been comminuted in a mill. This process probably results in a water continuous emulsion, which can be slightly thickened by the addition of a thickener. However, this emulsion is not a paste but a liquid and will display a water activity of more than 0.85. Therefore the microbiological stability, and the shelf life, of this product are insufficient for commercial use.

EP 78 8747 discloses mayonnaise-like products with a pH from 2 to 5 and comprising 55 to 85 wt % fat, denatured proteins, sugar, salt and 0.1 to 20 wt % vinegar. The emulsions however have water activity values of above 0.9.

U.S. Pat. No. 3,892,873 discloses emulsified oil dressings prepared with a serum protein emulsified obtained from egg yolk. The emulsions have water activity values of above 0.9.

JP 2000 093070 discloses a method for preparing a cookie by preparing an oil in water emulsion. When the emulsion comprises protein (from added flour) the percentage of oil in the emulsion is then no more than about 35 wt %.

U.S. Pat. No. 4,948,617 discloses a low cholesterol mayonnaise substitute. The water activity of the emulsion is above 0.9.

EP 509 579 discloses whippable non-dairy creams. The creams have high levels of water, and water activities are accordingly about 0.9.

JP 07255 376 discloses oil-in-water emulsion compositions to be used at the top or bottom of a dessert food. The emulsions contain high levels of water.

JP 02 145165 discloses emulsions for use in baking and confectionery. The emulsions comprise relatively high levels of water and high levels of either sugars and/or oils or have Aw of about 0.95.

JP 2000/139346 discloses emulsions comprising water, protein and high levels of oil. However, a humectant is not included.

JP 63 044841 discloses in broad terms highly viscous oil-in-water emulsions which comprise up to 70 wt % of edible fat or oil. The emulsions comprise about 30 wt % water even though they are highly viscous. The process to produce the emulsions involves an ultra high temperature treatment step.

JP 11 146756 discloses water in oil emulsions comprising high levels of water and also comprising proteins.

U.S. Pat. No. 5,698,254 discloses coconut cream alternatives which are water continuous fat emulsions comprising up to 30% vegetable fat and about 70 or 80 wt % of water. However, these type of emulsions, in general, have insufficient microbial stability and too short a shelf life and thus the properties of these emulsions are not as desired.

It is an object of the invention to address at least one of the aforementioned problems.

In particular, it is an object of the invention to provide fat emulsion which can be easily dispersed in un-heated water (i.e. water at ambient temperature, typically having a temperature of up to about 25 or 30° C.). Furthermore, the invention provides a fat emulsion, especially a coconut paste, that combines good water dispersibility with excellent storage properties and which can be made by a simple process.

SUMMARY OF THE INVENTION

It has been found that when a water continuous or bicontinuous fat emulsion is formulated in a given way, and the water activity (Aw) of that emulsion is controlled to within given limits, that one or more of the above technical problems is addressed.

The invention therefore provides, according to a first aspect, a water continuous or bicontinuous fat emulsion comprising:
  (i) 40 to 85 wt % of a vegetable or animal fat,
  (ii) 1 to 10 wt % of proteins,
  (iii) 1 to 35 wt % of at least one humectant selected from the group consisting of carbohydrates, polyalcohols and edible inorganic salts,
  (iv) 5 to 15 wt % of water,
  and which emulsion displays a water activity (Aw) of 0.6 to 0.8.

The emulsions of the invention have the advantages that they are easily dispersible in un-heated water, have good storage stability at 20-30° C. and can be made by a simple process.

The invention also provides according to a second aspect a method for the preparation of a water continuous or a bicontinuous emulsion comprising a vegetable or animal fat, proteins, at least one humectant and water, wherein the method comprises the steps;
 (i) white coconut meat is grated and subjected to pressing to produce coconut milk with a water content of from about 45 to 70 wt %,
 (ii) the coconut milk obtained is sieved to remove particles with a size of more than 150 microns,
 (iii) one or more humectants are added to the product from (ii),
 (iv) the product obtained from (iii) is pasteurised,
 (v) the pasteurised product from (iv) is subjected to an evaporation under reduced pressure at relatively low temperature resulting in a product with a water content of from 5 to 15 wt %,
 (vi) optionally a protein and a humectant, are added to the product obtained after step (v),
 (vii) the product is collected.

A further advantage of the emulsions of the invention is that when they are exposed to the air, e.g. when packed in a closed container which is subsequently opened, the emulsions are not subject to rapid microbiological spoilage because of their low water activity.

Except in the operating and comparative examples, or where otherwise explicitly indicated, all numbers in this description indicating amounts of material or conditions of reaction, physical properties of materials and/or use are to be understood as modified by the word "about." All amounts are by weight, unless otherwise specified.

DETAILED DESCRIPTION OF THE INVENTION

It is essential that the emulsions of the invention are water continuous or bicontinuous or otherwise they are not easily dispersible in cold water. By the term "cold water" as used herein is meant water that is not heated, that is, water of about ambient temperature.

The storage properties of the emulsions also strongly depend on the water activity thereof. This water activity (Aw) is defined as the ratio of the water pressure of the (food) substrate to the water pressure of pure water at the same temperature. Aw is measured by "Hygroskop BT-RS1" meter available from Retronic A.G., Switzerland or by an "Aw Box" available from Novasina, Switzerland.

The emulsions have a water activity (Aw) in the range of from 0.6 to 0.8. Preferably, the water activity is in the range of from 0.6 to 0.7.

The water activity is obtained, generally, by evaporating (or otherwise removing water from the emulsion until the required water activity is achieved.

The claimed water activity of the emulsions is obtained, generally, by evaporating (or otherwise removing) water until the desired water activity is achieved.

Within the water activity of 0.6-0.8, the amounts of humectant and water can be balanced to produce the desired water activity within this range whilst maintaining the water continuous or bi-continuous properties of the emulsion. This is influenced also by the amount of water in the emulsion. It is preferred that the emulsions comprise water and one ore more humectants in a weight ratio of from 3 to 1:1 to 3, more preferably 2.5 to 1:1 to 2.5, most preferably 2 to 1:1 to 2, such as 1.5 to 1:1 to 1.5.

The type of emulsion can be determined by measuring the electrical conductivity of the emulsion; conductivities of less than 1 micro Siemens/cm are considered as representative for emulsions that are fat continuous emulsions, whilst conductivities of more than 1000 micro Siemens/cm are considered as typical for water continuous emulsions.

The emulsion has the consistency of a paste and therefore displays a viscosity in the range of from 50-400 Pa.s, preferably between 100-200 Pa.s, at shear rate 1/s as measured by Carrimed rheometer CSL 100. The emulsions may also preferably have a Stevens hardness in the range of from 25-200 or 400 g, preferably 40-125 gram as measured by Stevens LFRA Texture Analyzer at 22° C. with probe diameter 12.7 mm (0.5 inch), speed 2 mm/s, and penetration depth 25 mm.

The fat component of the emulsions is a vegetable fat or animal fat and can be selected from a broad range of fats from which the most suitable fats are fats selected from at least one of the group consisting of: palm oil and hardened palm oil or factions thereof; soy bean oil and hardened soy bean oil or fractions thereof; sunflower oil and hardened sunflower oil or fractions thereof; rape seed oil and hardened rape seed oil or fractions thereof; cotton seed oil and hardened cotton seed oil or fractions thereof, arachidic oils and hardened arachidic oil or fractions thereof. It is preferred that the fat component is selected from palm kernel oil and hardened palm kernel oil or fractions thereof; coconut oil and hardened coconut oil or fractions thereof. Mixtures of one or more of these fats may also be used. The most preferred fats are the fats based on palm kernel or coconut, as these fats are required for the preparation of a coconut cream.

The emulsion comprise an amount of from 40 to 85 wt % of the vegetable or animal fat, based on the weight of the emulsion. Preferably the emulsions comprise an amount 52 to 67 wt % of a vegetable or animal fat.

In order to stabilise the emulsion it can comprise an amount of protein, in particular, proteins derived from dairy products such as milk or whey protein. Proteins from vegetable sources or from animal sources such as chicken may also be applied. However the use of caseinate is preferred. These proteins also have emulsifier properties and therefore can stabilise the emulsions. The emulsions comprise an amount of from 1 to 10 wt % of protein, preferably 5 to 8 wt %.

The emulsions also contain at least one humectant. The humectant plays a role both in the control of the water activity of the emulsion and in determining its consistency. The humectant may be selected from carbohydrates, polyalcohols and edible inorganic salts. The carbohydrates suitably are selected from the group consisting of mono, di and polysaccharides, hydrolysed polysaccharides, chemically or enzymatically modified polysaccharides. In combination with, or independently, a polyalcohol can be present as humectant. The most preferred polyalcohol is glycerol. The edible inorganic salts can also be used to control the water activity of the emulsion. It is especially preferred that the salt is derived from an alkali or alkaline earth metal salt, especially of a halogenide. Accordingly, sodium or potassium halogenides are preferred.

The emulsions comprise an amount of from 1 to 30 or 35 wt % of the humectant, preferably 5 to 20 wt %. For some systems amounts of 20 to 30 wt % may be used. A mixture of one or more types of the above humectants may be used.

The emulsions also comprise 5 to 15 wt %, preferably 11 to 15 wt % of water. For some emulsions, amounts of up to 25 wt % of water may be used.

In addition to the above components, the emulsion can also comprise a preservative. These can be selected from well known food grade preservatives including potassium sorbate; sulphur dioxide, hydroxybenzoic acid or its lower alkyl esters (i.e. derived from alcohols with 1 to 4 C-atoms), sodium hydrogensulphite or potassium hydrogensulphite or meta sulphites from alkali metals.

The emulsions of the invention have the additional advantage that because of their low water activity it is not necessary to add edible acids in order to prevent microbiological spoilage. Not adding edible acids can also have taste advantages for some emulsions e.g. those based on coconut may suffer undesirable taste changes if significant levels of acid are added.

Accordingly, the emulsions preferably comprise less than 5% by weight, more preferably less than 1% by weight of edible acids. It is especially preferred that the emulsions are substantially free of added edible acid.

The emulsions of the invention typically are pastes and preferably have a non-transparent white colour. They are intended for use either as a food product per se, or more preferably in the preparation of food products. The emulsions may be diluted with water before use, or, they may be used in their undiluted state. In either case the emulsions may be used in the preparation of food products such as stews, curries, meat based and vegetable based meals and sauces. The shelf life of the emulsion is more than 6 months at 20 to 35° C., which makes for excellent commercial use.

The emulsions can be prepared by any suitable method. Preferably, they are prepared by a method which ensures that the flavour components of the fat component, e.g. coconut, remain in the emulsion. The most preferred process for producing a coconut fat based product forms the second aspect of the invention.

Typical conditions that are applied in step (i) of the method of the invention are overpressures of from 5 to 350 kg/cm2, whereas the evaporation in step (v) is preferably performed at a pressure of from 10 to 50 mm Hg and at a temperature of from 40 to 70° C.

The emulsions may be subjected to a heat treatment step if desired. Preferably the emulsions are subjected to a mild heat treatment step as a harsher step, such as ultra high temperature treatment, may result in discolouration or undesirable flavour changes of the emulsion. When used, this heat treatment step is undertaken to inhibit microbiological growth. Suitable conditions for the mild heat treatment are heating the emulsion at elevated temperatures for up to about 10 minutes. For example, heating at 65-75° C. for up to 5 minutes. Heating conditions of 70° C. for 5 minutes or 75° C. for 1 minute are suitable examples.

Split stream processing, however, is also possible. Herein the water and the fat phases are separated and thereafter the other ingredients (including humectants) are added to the water phase or to part of the water phase, which is then totally or partially recombined with the fat phase. Many variations however are possible here, in particular with respect to limitation of the amount of partial product that will be subjected to pasteurisation conditions.

The invention will be further explained by reference to the following examples. Further examples within the scope of the invention will be apparent to the person skilled in the art.

EXAMPLES

A. All-in-one process

1. A fresh coconut milk product was produced from grated mature coconut meat, free from brown testa, with a hydraulic press without added water at a temperature of 25-30° C. Large solids and possible impurities were removed by a vibratory sieve of 150 microns. Yield of the fresh product was around 70%.

The fresh product was after pressing immediately heated for 1 min at 75° C. to avoid discoloration and/or other microbiological deterioration processes. The product contained 56 wt % water, 34 wt % oil, 3.5 wt % protein and 6.5 wt % carbohydrates.

2. To the fresh product the following ingredients were added (basis of 100 parts product):

| | parts |
|---|---|
| NaCl | 1.25 |
| Sucrose | 1.25 |
| Glycerine (60% w/w) | 2.50 |
| $TiO_2$ | 0.30 |
| $SO_2$ (as $Na_2S_2O_5$) | 0.05 |
| Sodium caseinate | 0.25 |
| Dextrin | 5.90 |
| Hydrolysed starch | 0.49 |
| Antioxidants | 0.01 |

The product and ingredients were mixed in a mixing vessel, equipped with a Silverson high-speed stirrer and stirred for circa 2 minutes and again heated for 1 minute at 75° C.

3. Subsequently, the water level of the mixture was reduced in a Roto-visco vacuum evaporator set at a reduced pressure of −50/−60 cm Hg and a temperature of 55° C. The water evaporation converted the oil-in-water emulsion into a thick paste, the final water level was 12.5 wt %. The water activity of the product was 0.65.

4. The product was removed from the Roto-visco equipment and stored in a suitable closed container. Using the ingredients and process mentioned a safe (microbiologically) product was obtained with a storage stability of at least 9 months at 20-30° C.

5. To reconstitute the coconut milk the concentrated product was mixed with water of 30° C. by simple stirring for circa 2 minutes. A typical ratio of 1 part paste to 3 parts of water was used.

B. Split process—1

1. Step 1 as detailed in example A was repeated.

2. The fresh product was fed into a continuous centrifuge in which oil phase and water phase were separated.

3. To ⅓ parts of the water phase the following ingredients were added (basis of 100 parts end product):

| | parts |
|---|---|
| NaCl | 2.60 |
| KCl | 1.80 |
| Sucrose | 14.20 |
| Glycerine (95% w/w) | 13.70 |
| $TiO_2$ | 0.50 |
| $SO_2$ (as $Na_2S_2O_5$) | 0.10 |
| Sodium caseinate | 1.20 |
| EDTA | 0.002 |
| Antioxidants | 0.008 |

The water phase and ingredients were mixed in a mixing vessel, equipped with a Ultra Turrax stirrer, and stirred for circa 5 minutes and again heated for 1 minute at 75° C.

4. Subsequently the oil phase was mixed into the water phase and homogenised with a colloid mill. The homogenisation converted the oil-in-water emulsion into a thick paste, the final water level was 13.5%. The water activity of the product was 0.63.

5. The product was packed in a suitable closed container. Using the ingredients and process herein a safe (microbiologically) product was obtained with a storage stability of at least 9 months at 20-30° C.

6. To reconstitute the coconut milk the concentrated product was mixed with water of 30° C. by simple stirring for circa 2 minutes. A typical ratio of 1 part paste to 3 parts of water was used.

C. Split process—2

1. Step 1 as detailed in Example A was repeated
2. The fresh product was fed into a continuous centrifuge in which oil phase and water phase were separated. The water phase was taken for the concentration step and the water level reduced.
3. To the water phase the following ingredients were added (basis of 100 parts product):

|  | parts |
|---|---|
| NaCl | 1.25 |
| Sucrose | 1.25 |
| Glycerine (60% w/w) | 2.50 |
| $TiO_2$ | 0.30 |
| $SO_2$ (as $Na_2S_2O_5$ or $NaHSO_3$) | 0.05 |
| Sodium caseinate | 0.25 |
| Dextrin | 5.90 |
| Hydrolysed starch | 0.49 |
| Antioxidants | 0.01 |

The water phase and ingredients were mixed in a mixing vessel, equipped with a Silverson colloid mill for circa 2 min and again heated for 1 minute at 75° C.

4. Subsequently, the water level of the mixture was reduced in a Roto-visco vacuum evaporator set at a reduced pressure of −50/−60 cm Hg and 55° C. to obtain a final water level of 13 wt % in the concentrated paste. The water activity of the water phase was 0.65.
5. The concentrated water phase was removed from the Roto-visco equipment.
6. Subsequently the oil phase was mixed into the water phase and homogenised with a colloid mill. The homogenisation converted the oil-in-water emulsion into a thick paste, the final water level was 13.5%. The water activity of the product was 0.65.
7. The product was packed in a suitable closed container. Using the ingredients and process mentioned a safe (microbiologically) product was obtained with a storage stability of at least 9 months at 20-30° C.
8. To reconstitute the coconut milk the concentrated product was mixed with water of 30° C. by simple stirring for circa 2 minutes. A typical ratio of 1 part paste to 3 parts of water was used.

The invention claimed is:

1. Water continuous or bicontinuous fat emulsion comprising:
    (i) 40 to 85 wt % of a vegetable or animal fat;
    (ii) 1 to 10 wt % of proteins
    (iii) 1 to 35 wt % of at least one humectant selected from the group consisting of carbohydrates, polyalcohols and edible inorganic salts;
    (iv) 5 to 15 wt % of water, and which emulsion displays a water activity (Aw) of 0.6 to 0.8 said emulsion having a non-transparent white colour and a consistency of a paste, displaying a Stevens value between 25-200 grams, and/or a viscosity between 50-400 Pa.s and/or a conductivity higher than 1 micro Siemens/cm.

2. An emulsion according to claim 1, wherein the emulsion displays a water activity of from 0.6 to 0.7.
3. An emulsion according to claim 1, wherein the emulsion comprises 52 to 67 wt % of a vegetable or animal fat.
4. An emulsion according to claim 1, wherein the fat is selected from at least one fat of the group consisting of palm oil and hardened palm oil or factions thereof; soy bean oil and hardened soy bean oil or fractions thereof; sunflower oil and hardened sunflower oil or fractions thereof; rape seed oil and hardened rape seed oil or fractions thereof; cotton seed oil and hardened cotton seed oil or fractions thereof, arachidic oils and hardened arachidic oil or fractions thereof and mixtures of one or more of these fats.
5. An emulsion according to claim 4, wherein the fat is selected from palm kernel oil and hardened palm kernel oil or fractions thereof; coconut oil and hardened coconut oil or fractions thereof and mixtures of one or more of these fats.
6. An emulsion according to claim 1, wherein the emulsion comprises 5 to 8 wt % of proteins.
7. An emulsion according to claim 1 wherein the protein is derived from animal dairy or vegetable proteins.
8. An emulsion according to claim 7, wherein the protein is caseinate.
9. An emulsion according to claim 1, wherein the carbohydrate is selected from the group consisting of mono, di and polysaccharides, hydrolysed polysaccharides, chemically or enzymatically modified polysaccharides.
10. An emulsion according to claim 1, wherein the polyalcohol is glycerol.
11. An emulsion according to claim 1, wherein the edible inorganic salt is an alkali or alkali earth metal salt of a halogenide.
12. An emulsion according to claim 1, wherein the emulsion comprises 11 to 15 wt % of water.
13. An emulsion according to claim 1, wherein the emulsion comprises a preservative.
14. An emulsion according to claim 13, wherein the preservative is selected from the group consisting of potassium sorbate; sulphur dioxide, hydroxybenzoic acid or C1-C4 alkyl esters thereof, sodium hydrogensulphite or potassium hydrogensulphite or meta sulphites from alkali metals.
15. An emulsion according to claim 1, wherein the emulsion has a shelf life at 20 to 35° C. of more than 6 months.

* * * * *